Figure 3:
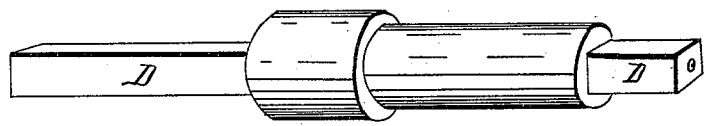
Figure 2:
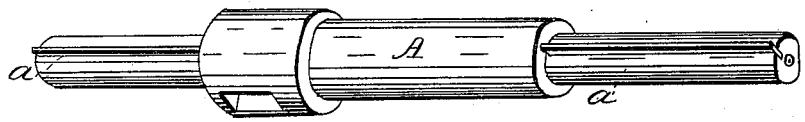
Figure 4:
Figure 1:
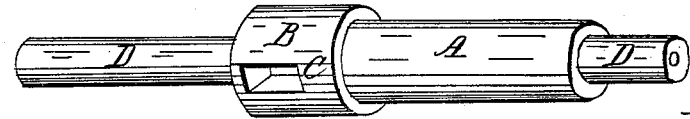

J. Hinds,
Boring Gage.

N°488.    Patented Nov. 25, 1837.

Witnesses:
Daniel Whiting
H. L. Whiting

Inventor:
James Hinds

UNITED STATES PATENT OFFICE.

JAMES HINDS, OF TROY, NEW YORK.

APPARATUS FOR BORING THE HUBS OF WHEELS, &c.

Specification of Letters Patent No. 488, dated November 25, 1837.

*To all whom it may concern:*

Be it known that I, JAMES HINDS, of the city of Troy, in the county of Rensselaer, and State of New York, have invented a new and improved mode of boring the holes or centers of metallic or wooden wheels or other articles requiring to be bored out true and straight or tapering; and I do hereby declare that the following is a full and exact description.

My improvement consists of a tool and is applicable to all kinds of iron gearing, wheels, pulleys, coupling boxes or other metallic or wooden articles used about mills, factories, steam engines, &c., requiring to be bored out perfectly true and straight or tapering. It is used in a common engine or other lathe constructed for such purposes and its description will sufficiently explain its nature and principle. I construct the tool in the following manner: I first made a casting or other metallic tube or cylinder, taking care to bore it out perfectly straight and true. This is represented in the annexed drawing by the letter A in Figure I. I then shrink a wrought iron band or collar onto one end of the cylinder as at B, and near the outer end I make an opening on one side extending in through both the band and cylinder of the form of a parallelogram as shown at C, in which the cutter is to be fixed by being keyed in as in other cases of like nature. I then make a cast steel or iron mandrel of about twice the length of the cylinder and of such size as to pass snugly within it yet so as to allow the cylinder to slide easily upon the mandrel one way or the other its whole length, without shake or play sidewise. The mandrel is represented in the drawing by D, D. This with the cylinder and cutter in place constitutes the tool for boring.

The manner of using it is as follows—In the first place I chuck the article to be bored upon the face plate of the lathe, leaving the center of the lathe spindle in its place. I then place the boring tool between the centers of the lathe, the mandrel being provided with the usual sink or indentations for a center at each end, and the opening to be bored out having been cast or made of such dimensions as to admit the mandrel through it, I move the cylinder forward so as to bring the cutter in contact with the wood, taking care to have a length of mandrel forward of the cylinder equal to the depth of the opening to be bored out, and after screwing a dog onto the opposite end of the cylinder to keep it from revolving I start the lathe and the arm of the dog being placed against the stud of the slide nut serves to force the cylinder forward by means of the regular feed of the lathe. By this operation and the revolving of the chucked article the opening will be bored out perfectly straight.

In order to bore it tapering it is only necessary to move the back center of the lathe horizontally one way or the other to a greater or less extent according as the front or back end is required to be the largest or the opening more or less tapering.

These mandrels with their cylinders fitted to each may be so varied in length and size as to bore out openings of all sizes from one and one-half to eighteen inches in diameter in any article that can be chucked on the lathe.

The tool may be used in a common hand lathe for some purposes by having a screw cut on the back end of the mandrel and a nut bolted to it so that by turning the nut the cylinder will be forced forward in the operation.

To bore openings within straight or tapering articles which cannot be made to revolve in a lathe, such for instance as large cranks for steam boat engines or the like the tool itself must be made to revolve. For this purpose the mandrel should have a feather let into it and the cylinder corresponding grooves in the inside, or the mandrel and inside of the cylinder may be made square in order that when one revolves the other must revolve with it. In using the tool in this case I place the crank or other article on the lathe in a proper position to be bored, squaring it by the ways of the lathe and confining it to its place with screw bolts. I then put the mandrel through and between the centers of the lathe as above described and fasten a dog on the end next to the face plate connecting it therewith so that when the plate revolves the mandrel and cylinder will revolve together with it and the cylinder as in the other case be forced forward by means of the regular feed of the lathe. And in order to bore the hole tapering in this case one end of the mandrel should be provided with one or more eccentric points or indentations for the center of the lathe as shown in Fig. IV of the drawings. And in placing the back center of the lathe in one or the other of these eccentric points the opening will be bored more or less tapering according to the distance such point is from the center of the mandrel the back end of the opening being the longest. To bore the opposite end the longest the ends of the mandrel should be reversed placing the eccentric point upon the forward center of the lathe.

The feather in the mandrel with its corresponding groove in the cylinder and also the square mandrel and opening in the cylinder are represented in the drawings by Figs. II and III.

From the above description the nature and principle of my improvement are presumed to be obvious. In the first place the mandrel supported at each end by the centers of the lathe gives firmness to the cutter, enabling it to bore out openings irregularly cast, and which requires as is often the case a deep cut on one side in order to keep the cutter under the sand and leaks from the casting on the other, which cannot be done in the usual way of boring by a long projecting cutter fastened in the stud of the slide rest of the lathe, without much greater expense of time and tools than when performed in this improved mode. And in the second place the facility and exactness with which the opening is bored tapering with this tool gives it a still more desired advantage (and for these same reasons) over the common method in respect to time, expense and the correctness of the work.

What I claim therefore and desire to secure by Letters Patent is—

A tool constructed in the manner and upon the principles and for the purposes above specified and described.

Subscribed this 8th day of August 1837.

JAMES HINDS.

Witnesses:
Daniel Whitney,
H. L. Whiting.